March 18, 1958 J. L. REILEY 2,826,914
VELOCITY SENSITIVE DEVICE
Filed Feb. 27, 1953 2 Sheets-Sheet 1
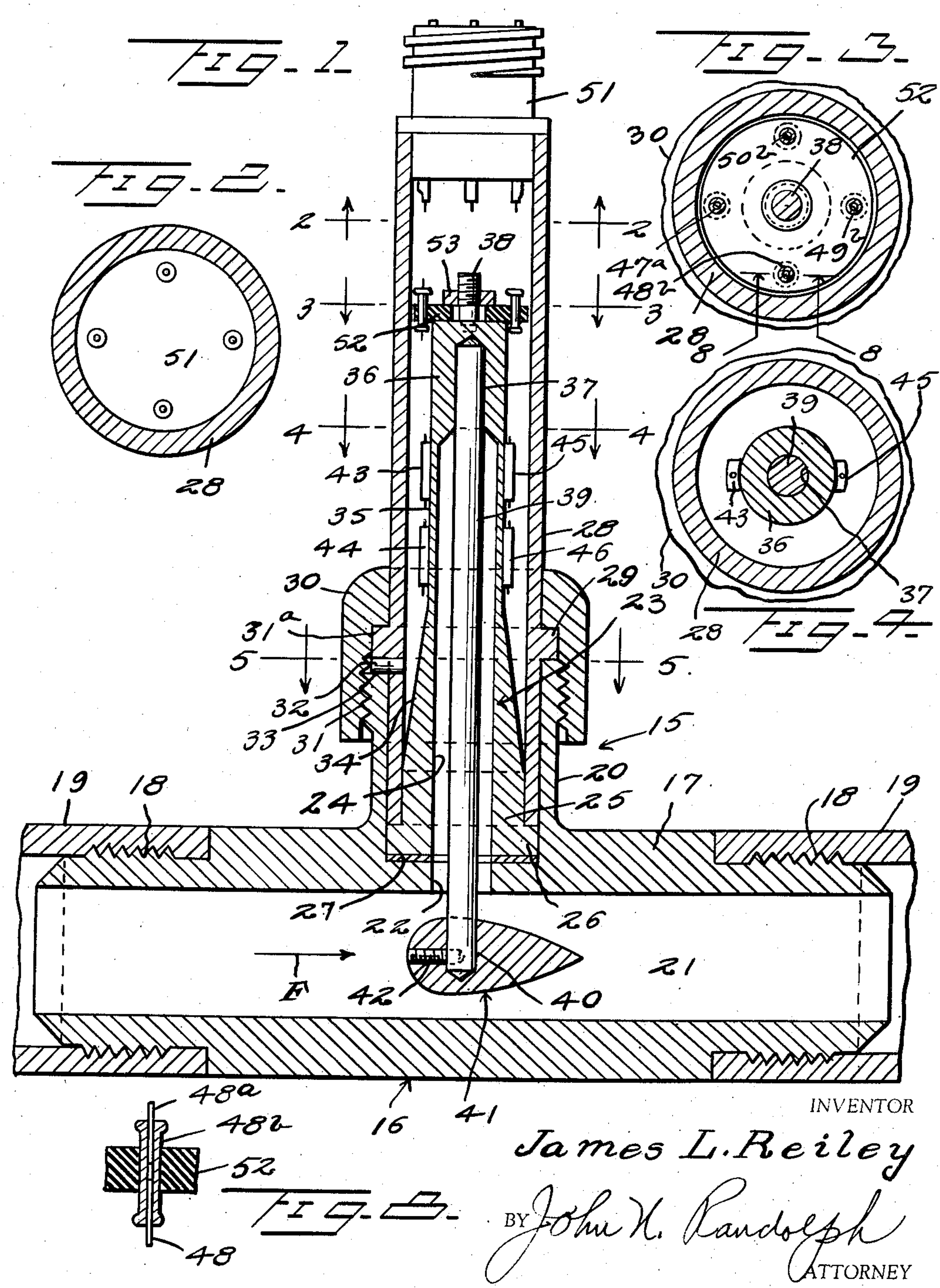
INVENTOR
James L. Reiley
BY John H. Randolph
ATTORNEY March 18, 1958 J. L. REILEY 2,826,914
VELOCITY SENSITIVE DEVICE
Filed Feb. 27, 1953 2 Sheets-Sheet 2
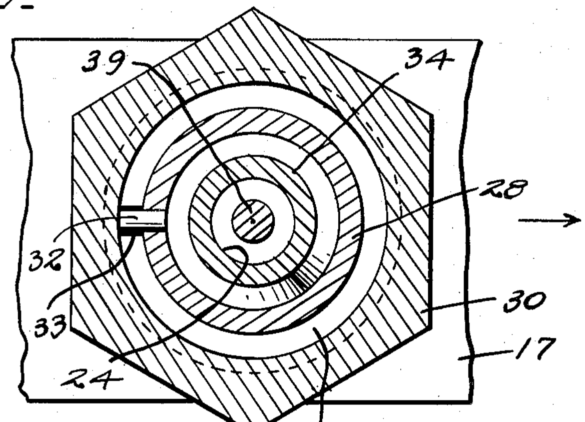
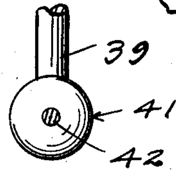
FIG-7
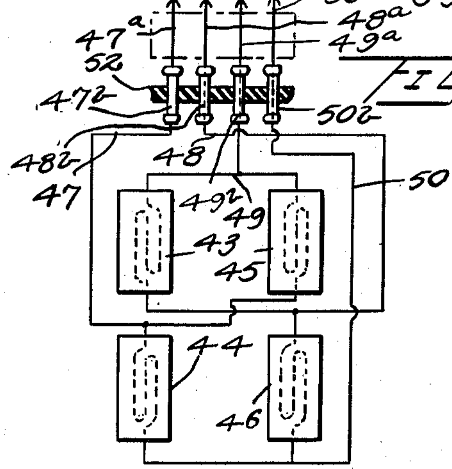
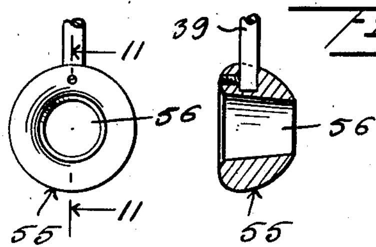
INVENTOR
James L. Reiley
BY John N. Randolph
ATTORNEY United States Patent Office 2,826,914

Patented Mar. 18, 1958

2,826,914

VELOCITY SENSITIVE DEVICE

James L. Reiley, Elliotsburg, Pa.

Application February 27, 1953, Serial No. 339,213

5 Claims. (Cl. 73—228)

This invention relates to a device of extremely simple construction for measuring the velocity of a liquid or gas and through the use of which the measurements obtained may be readily converted into force units capable of being accurately measured to determine not only the velocity but also the flow rate, the total flow for a given period of time and the viscosity of the medium being measured.

Another and particularly important object of the invention is to provide a device having no moving parts such as propellers, water wheels, moving vanes, rotometer floats, displaceable mercury columns and the like, and wherein the only movement between parts of the device is a slight yielding movement occurring in response to the force of the flowing stream being measured so that movement of this character occurs only when there is a change in the velocity in the flow stream.

Another object of the invention is to provide a device capable of measuring the velocity in a liquid or gaseous flow stream and which is equally well adapted to measure movement relatively to a liquid or gas whereby the device may be mounted, for example, on a watercraft or aircraft for measuring the speed of movement of a craft either through the water or through the air, respectively.

Conventional flow meters are responsive to pressure and pressure drop and in order to measure the flow rate must provide an obstruction in a flow stream which frequently retards the rate of flow as much as fifty percent and thus wastes one-half of the horsepower required for driving a pumping means to maintain the flow rate, whereas the present invention is not responsive to pressure or pressure drop but to force only due to velocity and does not utilize an obstruction in the flow stream but merely a restriction so that even at very high flow rates the flow stream is retarded not more than approximately five percent and at lower flow rates a much less retarding of the flow stream occurs.

Various other objects and advantages of the invention will hereinafter become more fully apparent from the following description of the drawings, illustrating one presently preferred embodiment thereof, and wherein:

Figure 1 is a substantially central vertical sectional view, partly in side elevation, illustrating one preferred application and use of the device;

Figures 2, 3, 4 and 5 are enlarged cross sectional views of the device taken substantially along planes as indicated by the lines 2—2, 3—3, 4—4 and 5—5, respectively;

Figure 6 is an end view of the resistrictor looking toward its enlarged forward end or from left to right of Figure 1;

Figure 7 is an enlarged fragmentary vertical sectional view of a portion of the device;

Figure 8 is an enlarged fragmentary sectional view taken substantially along a plane as indicated by the line 8—8 of Figure 3;

Figure 9 is a diagrammatic view of a four active arm, modified Wheatstone, bonded strain gauge electric bridge circuit;

Figure 10 is an end view similar to Figure 6 of a third form of restrictor, and

Figure 11 is a sectional view thereof taken substantially along a plane as indicated by the line 11—11 of Figure 10.

Referring more specifically to the drawings, a preferred embodiment of the velocity sensitive device is illustrated in the drawings, particularly Figure 1, and is designated generally 15. The device 15 as illustrated includes a support, designated generally 16, herein illustrated as a housing or coupling having a straight tubular portion 17 interposed between and threadedly coupled at its ends at 18 to adjacent ends of two sections 19 of a conduit constituting a flow line for a fluid medium which may be either a liquid or a gas. However, as the description proceeds it will become apparent that the support 16 may assume other forms depending upon the fluid flow to be measured thereby. The housing or coupling 16 has a lateral extension 20 intermediate of its ends defining a hollow externally threaded boss which communicates with the bore 21 of the tube portion 17 by way of a restricted port or opening 22.

An elongated hollow sensing member, designated generally 23 has an elongated recess 24 opening outwardly of one end 25 thereof, which end is provided with an external flange 26. The end 25 of the hollow sensing member 23 seats in the housing boss 20, the flange 26 having a close fitting engagement in the inner part of said boss 20. A gasket 27 is disposed in the inner end of the boss 20 and against which the end 25 of the hollow member 23 abuts. The gasket 27 is of annular form and the bore thereof aligns with the port 22 and with the recess 24, all of which parts are in registration, as seen in Figure 1.

A sleeve-like casing 28 has an inner end seating in the boss 20 against the flange 26 and which has close fitting engagement around the end portion 25, beyond which the flange 26 is disposed. The casing 28 is provided with an annular external enlargement or collar 29 which seats against the outer end of the boss 20. A nut 30 turnably engages the casing 28 and is internally threaded to threadedly engage the externally threaded outer end of the boss 20 to provide a threaded connection 31. The nut 30 is also recessed at 31*a* to accommodate the collar 29 to secure said collar tightly against the outer end of the boss 20. The casing 28 has an alignment pin or projection 32 extending radially therefrom and disposed on the inner side of the collar 29. The pin or projection 32 seats in a radial notch 33 in the outer end of the boss 20 for correctly positioning the casing 28 and sensing member 23 relatively to the housing bore 21 and the axis of the conduit sections 19.

The hollow sensing member 23 commerces to taper externally from near its flanged end 26 to provide an elongated externally tapered portion 34 which is spaced from the inner surface of the casing 28 and which terminates in a thin walled portion 35 which defines the other end of the elongated recess 24. The other end 36 of the hollow member 23 which is disposed beyond the last mentioned end of the recess 24 is provided with a socket 37, which is preferably disposed axially of said hollow member 23 and which opens into said last mentioned end of the recess 24. A threaded stud 38 projects from the distal end of the portion 36.

An elongated lever arm 39 has one end seated and secured in the socket 37 and said lever arm extends therefrom axially through the elongated recess 24 and the opening 22 and is substantially smaller in cross section than said recess and opening for movement relatively thereto in directions transversely thereof. The other end of the lever arm 39 extends transversely into the bore 21 and is received in a transversely disposed socket 40 of a restrictor element 41 which is secured rigidly to the lever arm by a setscrew 42. In the form of Figures 1 and 6, the restrictor 41 is of an extended elliptical or tear-drop shape with the longitudinal axis thereof disposed axially of the bore 21 and with its enlarged end facing toward the direction of flow of a fluid medium through said bore, as indicated by the arrow F. The streamline shape of the restrictor may be varied within a range wherein the maximum diameter is at least one-sixth the over-all length and no greater than one-half of said length. Likewise, obviously the size of the restrictor will vary depending upon the cross sectional size of the bore 21 in which it is disposed.

The thin walled portion 35 is capable of flexing and the interior and exterior surfaces thereof are absolutely concentric so that forces of tension and compression on upstream and downstream sides thereof will be of the same relative magnitude. Said hollow member 23 is precision machined of a special corrosion resistant steel having a high modulus of elasticity and a low coefficient of expansion in response to temperature.

To illustrate one form of apparatus which may be employed for measuring the actual force or strain on the strain sensitive wall portion 35, four conventional wire strain gauges of conventional construction are employed, each of which is essentially a wire resistance of thin wire secured in the form of a grid on a membrane of tissue paper or plastic. Two of said strain gauges 43 and 44 are suitably cemented or bonded solidly to the upstream side of the thin wall portion 35 and the other two strain gauges 45 and 46 are similarly secured to the downstream side of the wall portion 35. Said gauges are disposed with their strain sensitive axes parallel to the axis of the member 23 and are connected in an electric circuit of a four active arm, modified Wheatstone, bonded strain gauge bridge circuit, which is illustrated diagrammatically in Figure 9. Current is supplied to the four wire gauges by two conductors 47 and 48, each of which is connected to one of the strain gauges of the upstream side and one of the strain gauges of the downstream side of the wall portion 35 and by which current is supplied to the strain gauges either from batteries or a transformer, not shown. Two conductors 49 and 50 carry the output voltage from the four strain gauges, each of which is likewise connected to a strain gauge of the upstream and the downstream side of the wall portion 35. These conductors, 47, 48, 49 and 50 are very fragile and are connected by four small terminals **47*b*, 48*b*, 49*b* and 50*b*, respectively, to heavier, more flexible conductor wires 47*a*, 48*a*, 49*a* and 50*a*, respectively, which are in turn electrically connected to a standard electrical connector or plug 51 by which electrical connections for the four conductor wires are made to a conductor or cable, not shown, leading to a conventional electrical strain measuring indicator or recorder, not shown. The connector or plug 51 closes the outer end of the casing 28. The four terminals 47*b*, 48*b*, 49*b* and 50*b* are mounted immovably in a disk of electrical insulating material 52 which is disposed against the terminal of the sensing member end 36 by a nut 53 which engages the stud 38. Said stud 38 extends centrally through the disk 52 which is clamped against the end portion 36 by the nut 53. As seen in Figures 1 and 3, a clearance exists between the periphery of the disk 52 and the inner surface of the casing 28 which is sufficient to accommodate the flexing of the wall portion 35 and the movement of the end portion 36 of the member 23**.

Assuming that either a liquid or gas is flowing through the conduit 19 in the direction as indicated by the arrow F and that current is being supplied to the four strain gauges 43, 44, 45 and 46, the surface friction of the fluid medium passing around the restrictor element 41 will exert a force thereon in a direction corresponding to the direction of the arrow F which will be imparted through and magnified by the lever arm 39 to the portion 36 and the sensing member 23 and which will cause a flexing of the elastic thin wall portion 35 so that the part thereof to which the strain gauges 43 and 44 are secured will be compressed and the other downstream parts thereof to which the strain gauges 45 and 46 will be stretched or tensioned. The voltage output of the four strain gauges through the conductors 49 and 50 will vary directly in proportion to the strain applied thereto and which variation in voltage output may be indicated on any recording or indicating instrument capable of recording or indicating low voltage or current potential such as a null-balance millivolt potentiometer.

Under ordinary conditions where the velocity of flow is constant the restrictor 41 will remain stationary in the flow stream maintaining the wall portion 35 in a flexed condition so that movement of the lever arm 39 and restrictor 41 relatively to the support 16 and the end 25 of the hollow member 23 will occur only when there is a variation in the velocity of the flow stream. Thus, the restrictor 41 is substantially stationary and the entire sensing unit contains no moving parts.

The parts comprising the sensing unit 15 are preferably formed of a material which is not subject to corrosion, such as stainless steel or bronze.

It will also be noted that the restrictor 41 will offer a minimum of resistance to the flow through the bore 21. Proper streamline contouring of said restrictor, as previously described and as illustrated in the drawings, will allow fluid to remain laminar in nature over the entire surface of the restrictor. With laminar flow, the forces developed in the restrictor are due only to the rate of viscous shear and thereby proportional only to fluid velocity and in no way proportional to pressure drop. Slight distortion of the restrictor shape or irregularity of contour will cause turbulence of flow, resulting in forces on said restrictor 41, proportional to velocity head pressure (and pressure drop) or a blending of velocity head pressure and viscous shear forces, dependent upon the extent of distortion, as desired. Said restrictor 41 is in no way sensitive to the static or line pressure of the fluid.

The support 16 is maintained stationary with respect to the flow stream and thus provides a stationary support for the hollow sensing member 23. The unit could function for measuring the speed of movement of a craft through the air or water by merely mounting the restrictor 41 in an exposed position in the medium through which the craft is moving, as for example by having the boss 20 formed on the inner side of the hull or fuselage of a boat or aircraft, respectively, and having the lever arm 39 extending outwardly therethrough.

Figures 10 and 11 illustrate another form of restrictor, designated generally 55, of annular form having a bore 56 extending axially therethrough and disposed in alignment with the direction of flow. The annular wall of the restrictor 55 has a rounded forward end and has a portion of maximum radial thickness near its forward end and is tapered externally therefrom to its rear end. Other forms of restrictors may also be employed and which will afford a minimum of resistance to the movement of the flow stream in which the restrictor is immersed.

It will be understood that various other forms of indicating and recording instruments capable of measuring compression and tensile strains may be employed with the velocity sensitive device 15 for measuring the magnified strain forces imported by the restrictor and lever arm to the wall portion 35, including suitable mechanical devices.

Various other modifications and changes are likewise contemplated and may obviously be resorted to, without departing from the spirit or scope of the invention as hereinafter defined by the appended claims.

I claim as my invention:

1. A device for converting velocity into force units which can be measured to determine the velocity or rate of flow of a fluid, comprising a support with respect to which a fluid flows, said support having an opening open to the fluid, an elongated hollow member having a first end anchored to the support around the opening thereof and immovably disposed relative thereto, a lever arm having a portion immovably secured in a portion of the hollow member which is spaced from said first end, said lever arm having a second portion extending from said secured portion thereof through the first end of the hollow member and through said opening, said hollow member and opening providing clearance around said last mentioned lever arm portion, a restrictor mounted on said lever arm beyond said first end of the hollow member and support and supported by the lever arm in the flow stream, said hollow member having a weakened wall portion of a predetermined reduced thickness, relative to the remainder of said hollow member, located between said first end thereof and the portion of the hollow member in which the lever arm is secured whereby said weakened wall portion is flexed in response to a force exerted on said lever arm when said restrictor is displaced by forces due to the velocity of the passing fluid in which the restrictor is immersed, and wire strain gauges secured against said weakened wall portion, said wire strain gauges being responsive to flexure of the weakened wall portion for converting mechanical forces into electrical power capable of being utilized for measuring the velocity or rate of flow of the fluid in which said restrictor is immersed by the magnified force imparted thereby through the lever arm to said weakened wall portion.

2. A device for converting velocity into force units as in claim 1, wherein said restrictor is of extended elliptical shape such that the maximum transverse diameter thereof is no greater than one-half the maximum length and no less than one-sixth the maximum length thereof, said restrictor having a large rounded end facing toward the direction of flow of the fluid, and means detachably securing the restrictor to the lever arm.

3. A device for converting velocity into force units as in claim 1, wherein said restrictor element is of teardrop shape and includes an enlarged rounded end facing into the flow stream and an elongated tapered opposite end so that surface friction of the flow stream with the restrictor element will cause a flexing of said elastic thin walled portion to produce a compression strain on one side thereof to which certain of the strain gauges are secured and a tensile strain on the opposite side thereof to which other of said strain gauges are secured.

4. A device for converting velocity into force units which can be measured to determine the velocity or rate of flow of a fluid, comprising a support with respect to which a fluid flows, said support having an opening open to the fluid, an elongated hollow member having a first end anchored to the support around said opening and immovably disposed relative to the support, said hollow member including a rigid portion spaced from said first end, a rigid lever arm having a portion immovably secured to said rigid portion of the hollow member, said lever arm having a second portion extending from said secured portion thereof through the first end of the hollow member and through the opening of said support, said hollow member and opening providing clearance around said last mentioned lever arm portion, a restrictor mounted on said lever arm beyond said first end of the hollow member and the opening and supported by the lever arm in the flow stream, said hollow member having a weakened wall portion of a predetermined reduced thickness, relative to the thickness of the remainder of said hollow member, located between said first end thereof and said rigid portion of the hollow member, whereby said weakened wall portion is flexed in response to a force exerted on said lever arm when said restrictor is displaced by forces due to the velocity of the passing fluid in which the restrictor is immersed, and strain gauges, responsive to flexure, secured against said weakened wall portion for measuring the velocity or rate of flow of the fluid in which said restrictor is immersed by the magnified force imparted thereby through the lever arm to said weakened wall portion.

5. A device for converting velocity into force units as defined by claim 4, wherein said rigid portion of the hollow member constitutes an opposite end thereof, which is supported solely by said first end and by the weakened wall portion, for unimpeded movement in any direction, and which provides the sole support for said lever arm and for the restrictor which is mounted thereon, and wherein said strain gauges are secured to opposite sides of the weakened wall portion.

References Cited in the file of this patent

UNITED STATES PATENTS

| | | |
|---|---|---|
| 1,221,726 | Hamill | Apr. 3, 1917 |
| 1,407,060 | Graemiger | Feb. 21, 1922 |
| 2,024,571 | Gent | Dec. 17, 1935 |
| 2,322,319 | Ruge | June 22, 1943 |
| 2,472,045 | Gibbons | May 31, 1949 |
| 2,539,892 | Cook | Jan. 30, 1951 |
| 2,632,329 | Zuehlke | Mar. 24, 1953 |
| 2,647,403 | Fenske | Aug. 4, 1953 |
| 2,742,784 | Brous | Apr. 24, 1956 |

FOREIGN PATENTS

| | | |
|---|---|---|
| 631,973 | Great Britain | Nov. 14, 1949 |
| 76,568 | Austria | May 26, 1919 |
| 687,354 | Germany | Jan. 29, 1940 |
| 451,295 | Great Britain | Aug. 4, 1936 |
| 613,478 | Great Britain | Nov. 29, 1948 |